(12) United States Patent
Yost et al.

(10) Patent No.: US 12,522,361 B2
(45) Date of Patent: Jan. 13, 2026

(54) RECLINE LOCKOUT DEVICE FOR AIRCRAFT SEAT

(71) Applicant: B/E Aerospace, Inc., Winston-Salem, NC (US)

(72) Inventors: Austin Yost, Woodland Park, CO (US); Eston Miller, Winston-Salem, NC (US); William Patrick Johnson, Boone, NC (US); Rohn A. Bowden, Greensboro, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 348 days.

(21) Appl. No.: 18/229,823

(22) Filed: Aug. 3, 2023

(65) Prior Publication Data

US 2025/0042551 A1 Feb. 6, 2025

(51) Int. Cl.
*F16C 1/12* (2006.01)
*B64D 11/06* (2006.01)

(52) U.S. Cl.
CPC .............. *B64D 11/064* (2014.12); *F16C 1/12* (2013.01)

(58) Field of Classification Search
CPC ........... B64D 11/064; F16C 1/106; F16C 1/12
See application file for complete search history.

(56) References Cited

U.S. PATENT DOCUMENTS

| | | | |
|---|---|---|---|
| 5,216,934 A * | 6/1993 | Iwasaki | B63H 21/213 74/502 |
| 5,758,544 A | 6/1998 | Lee | |
| 7,182,402 B1 | 2/2007 | Ahad | |
| 7,587,956 B2 * | 9/2009 | Velasco, Jr. | G05G 5/06 74/502 |
| 9,981,571 B2 | 5/2018 | Garing | |
| 10,279,917 B1 | 5/2019 | Wilkey et al. | |
| 10,696,191 B2 | 6/2020 | Does | |

(Continued)

FOREIGN PATENT DOCUMENTS

| | | | | |
|---|---|---|---|---|
| DE | 102004032880 A1 * | 1/2006 | ................ | F16C 1/12 |
| DE | 202011005162 U1 * | 7/2011 | ........... | B60B 33/021 |

(Continued)

OTHER PUBLICATIONS

European Patent Office, Extended European Search Report received in EP Application No. 24192971.0, Sep. 27, 2024, 5 pages.

*Primary Examiner* — Timothy J Brindley
(74) *Attorney, Agent, or Firm* — Suiter Swantz IP

(57) ABSTRACT

A recline lockout device is disclosed. The device includes one or more modular lockout assemblies including a housing, one or more levers, and one or more shafts. The device may include one or more lockout cables coupled to actuator assemblies of the aircraft seats and a lever. Each actuator assembly may be configured to position the aircraft seats between an upright and reclined position. The device may include one or more lockout control mechanisms configured to cause the one or more lockout cables to translate. Upon translating, the first lever or the second lever may be configured to translate to cause the first lever to disengage from the second lever. Upon disengaging the first lever from the second lever, the first recline lever may be configured to disengage from the second recline cable to prevent the actuator assemblies from actuating between the upright and reclined position.

15 Claims, 14 Drawing Sheets

(56) References Cited

U.S. PATENT DOCUMENTS

| | | | |
|---|---|---|---|
| 10,829,223 | B2 | 11/2020 | Senneff et al. |
| 2018/0065521 | A1 | 3/2018 | Vela et al. |
| 2023/0109265 | A1 | 4/2023 | Nakane et al. |
| 2023/0366427 | A1 * | 11/2023 | Tokimasa ................ F16C 1/106 |

FOREIGN PATENT DOCUMENTS

| | | | |
|---|---|---|---|
| EP | 3744565 A1 | 12/2020 | |
| WO | 2022113737 A1 | 6/2022 | |
| WO | WO-2024242817 A2 * | 11/2024 | ........... B64D 11/064 |

\* cited by examiner

RECLINE LOCKOUT DEVICE FOR AIRCRAFT SEAT

BACKGROUND

Often it is desirable to have an aircraft seat configured with one or more comfort features for a passenger to adjust as necessary. For example, aircraft seats are often configured with recline mechanism to allow passengers to recline during flight. However, guidelines and/or standards require that the aircraft seat to be configured in a taxi, takeoff, or landing (TTL) position during select stages of flight.

SUMMARY

A recline lockout device for one or more aircraft seats is disclosed, in accordance with one or more embodiments of the present disclosure. The device includes one or more modular lockout assemblies. Each modular lockout assembly includes a housing including one or more sidewalls that define a cavity, the housing including one or more cable openings configured to receive one or more recline cables. Each modular lockout assembly includes one or more levers housed at least partially within the cavity of the housing, the one or more levers including at least a first lever coupled to a first recline cable of the one or more recline cables and a second lever coupled to a second recline cable of the one or more recline cables. Each modular lockout assembly includes one or more shafts, the one or more shafts including at least a first shaft and a second shaft, the first lever of the one or more levers configured to receive a portion of the first shaft and the second lever of the one or more levers configured to receive a portion of the second shaft, wherein the first lever is configured to pivot about an axis of the first shaft and the second lever is configured to pivot about an axis of the second shaft. The device includes one or more lockout cables coupled to one or more actuator assemblies of the one or more aircraft seats and at least one lever of the one or more levers, each actuator assembly configured to position the one or more aircraft seats between one of an upright position and a reclined position. The device includes one or more lockout control mechanisms configured to cause the one or more lockout cables to translate along an axis of the recline lockout device. Upon translating the one or more lockout cables along the axis, at least one of the first lever or the second lever is configured to translate along the axis to cause the first lever to disengage from the second lever. Upon disengaging the first lever from the second lever, the first recline lever is configured to disengage from the second recline cable to prevent the one or more actuator assemblies from actuating between the upright position and the reclined position.

In some embodiments, each modular lockout assembly may further include one or more latch springs configured to couple the one or more levers to a sidewall of the one or more sidewalls of the housing.

In some embodiments the device may further include a top plate including one or more lockout cable openings configured to receive the one or more lockout cables, the top plate configured to couple to the housing of at least one modular lockout assembly of the one or more modular lockout assemblies.

In some embodiments, the one or more shafts include one or more bearings.

In some embodiments the device may further include one or more lockout cable assemblies, each lockout cable assembly comprising at least one of one or more adjusters, one or more disconnects, or one or more compensators.

In some embodiments, the one or more sidewalls of the housing may include one or more stopper surfaces configured to prevent the one or more levers from pivoting a predetermined threshold.

In some embodiments, the one or more lockout control mechanisms may include one or more lockout levers coupled to a seat pan frame of the aircraft seat.

In some embodiments, the recline lockout device may be coupled to a seat frame of the one or more aircraft seats.

In some embodiments, the one or more modular assemblies may include a first modular assembly corresponding to a first aircraft seat within a row of aircraft seats; and one or more additional modular assemblies, each additional modular assembly corresponding to a respective aircraft seat within the row of aircraft seats, wherein the one or more additional modular assemblies are configured to be stacked on the first modular assembly.

A row of aircraft seats is disclosed, in accordance with one or more embodiments of the present disclosure. The row of aircraft seats includes a seat frame. The row of aircraft seats includes one or more actuator assemblies, each actuator assembly including an actuator and one or more actuating cables, the actuator configured to position the one or more aircraft seats between one of an upright position and a reclined position, each actuator assembly further including one or more passenger recline mechanisms configured to cause the actuator to position the one or more aircraft seats between one of the upright position and the recline position. The row of aircraft seats includes a recline lockout device coupled to the seat frame. The device includes one or more modular lockout assemblies. Each modular lockout assembly includes a housing including one or more sidewalls that define a cavity, the housing including one or more cable openings configured to receive one or more recline cables. Each modular lockout assembly includes one or more levers housed at least partially within the cavity of the housing, the one or more levers including at least a first lever coupled to a first recline cable of the one or more recline cables and a second lever coupled to a second recline cable of the one or more recline cables. Each modular lockout assembly includes one or more shafts, the one or more shafts including at least a first shaft and a second shaft, the first lever of the one or more levers configured to receive a portion of the first shaft and the second lever of the one or more levers configured to receive a portion of the second shaft, wherein the first lever is configured to pivot about an axis of the first shaft and the second lever is configured to pivot about an axis of the second shaft. The device includes one or more lockout cables coupled to one or more actuator assemblies of the one or more aircraft seats and at least one lever of the one or more levers, each actuator assembly configured to position the one or more aircraft seats between one of an upright position and a reclined position. The device includes one or more lockout control mechanisms configured to cause the one or more lockout cables to translate along an axis of the recline lockout device. Upon translating the one or more lockout cables along the axis, at least one of the first lever or the second lever is configured to translate along the axis to cause the first lever to disengage from the second lever. Upon disengaging the first lever from the second lever, the first recline lever is configured to disengage from the second recline cable to prevent the one or more actuator assemblies from actuating between the upright position and the reclined position.

In some embodiments, each modular lockout assembly may further include one or more latch springs configured to couple the one or more levers to a sidewall of the one or more sidewalls of the housing.

In some embodiments, the one or more shafts include one or more bearings.

In some embodiments the device may further include one or more lockout cable assemblies, each lockout cable assembly comprising at least one of one or more adjusters, one or more disconnects, or one or more compensators.

In some embodiments, the recline lockout device may be coupled to a seat frame of the one or more aircraft seats.

In some embodiments, the one or more modular assemblies may include a first modular assembly corresponding to a first aircraft seat within a row of aircraft seats; and one or more additional modular assemblies, each additional modular assembly corresponding to a respective aircraft seat within the row of aircraft seats, wherein the one or more additional modular assemblies are configured to be stacked on the first modular assembly.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Figure 1:
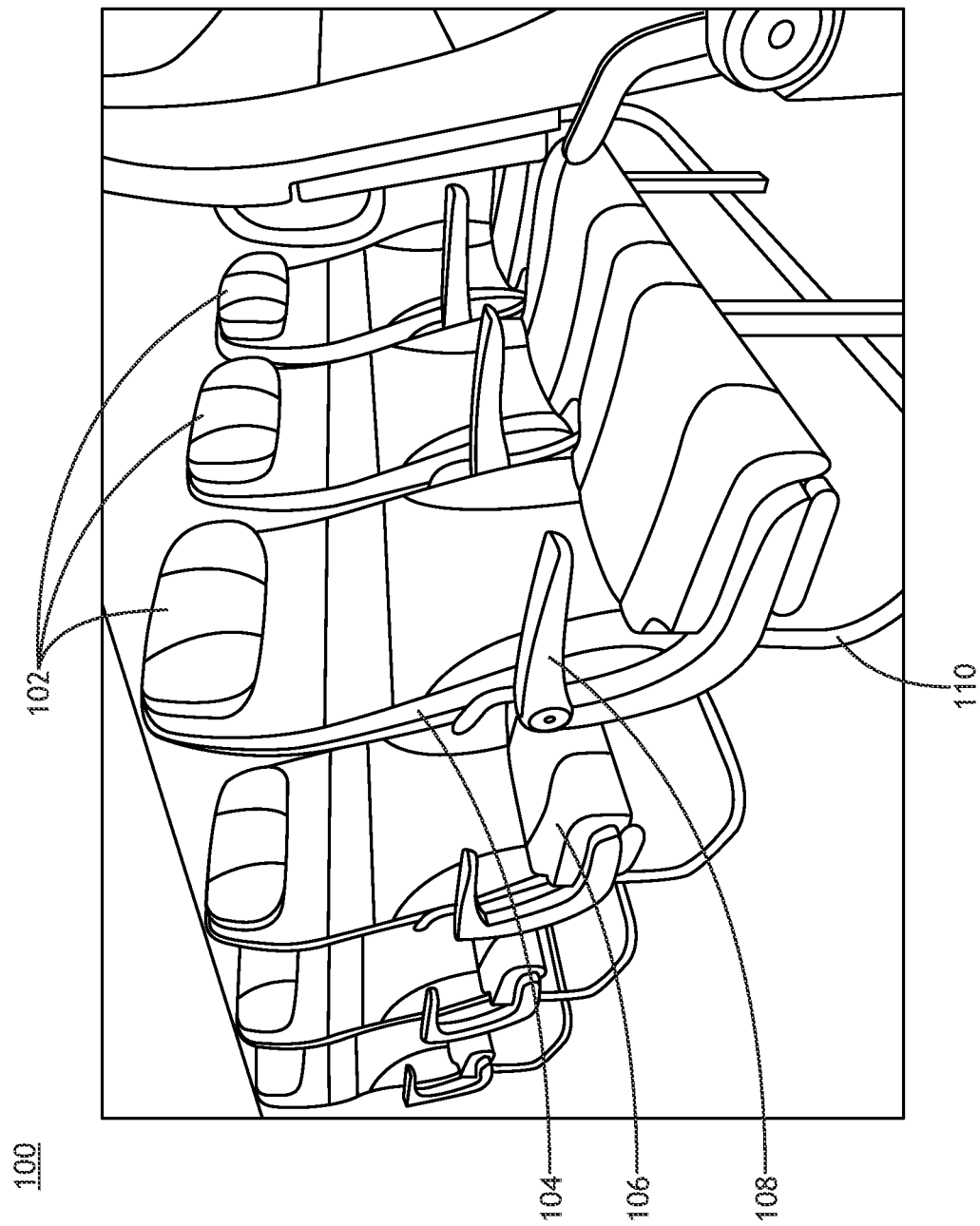
FIG. 1 is a simplified schematic view of an aircraft cabin with an aircraft seat including a recline lockout device, in accordance with one or more embodiments of the disclosure.

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one," "one or more," or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

FIGS. 1-5B in general illustrate a recline lockout device for an aircraft seat, in accordance with one or more embodiments of the disclosure.

Often it is desirable to have an aircraft seat configured with one or more comfort features for a passenger to adjust as necessary. For example, aircraft seats are often configured with recline mechanism to allow passengers to recline during flight. However, guidelines and/or standards require that the aircraft seat to be configured in a taxi, takeoff, or landing (TTL) position during select stages of flight. It is noted an upright or raised position may be considered the TTL position during select stages of flight (though the upright or raised position is not limited to use during the select stages of flight as the TTL position, but also may be used at any point during the flight), for purposes of the present disclosure. In addition, it is noted that any position that does not meet the above-defined requirements of the TTL position may be considered a non-TTL position, for purposes of the present disclosure. Therefore, the above description should not be interpreted as a limitation on the present disclosure but merely an illustration.

As such, there is a need for a recline lockout device for aircraft seats, which cures one or more of the shortfalls of previous approaches identified above. The lockout device should allow for passenger to individually recline their respective seats during select stages of flight when the lockout device is in the "unlocked" position. The lockout device should prevent passengers from individually reclining their respective seats during select stages of flight when the lockout device in the "locked" position. For example, a crew member may switch the lockout device to the "locked" position during select stages of flight (i.e. when the aircraft seat must be in the TTL position) to prevent the passengers from individually reclining their respective seats, in accordance with aviation guidelines and/or standards. In this regard, the crew member may lockout a row (or rows) of passenger aircraft seats using the lockout device.

It is noted herein that the recline lockout device may be implemented in any environment or number of environments. For example, the environment may include any type of vehicle known in the art. For instance, the vehicle may be any air, land, or water-based personal equipment or vehicle; any air, land, or water-based commercial equipment or vehicle; any air, land, or water-based military equipment or vehicle known in the art. By way of another example, the environment may include a commercial or industrial establishment (e.g., a home or a business).

Where the environment may be an aviation environment, the aircraft cabin designs need to be certified in accordance with aviation guidelines and standards, while being designed so as not to lose the intended functionality of the structures and/or monuments in the aircraft cabin. For example, the aircraft seats within the aircraft cabin may need to be configured in accordance with aviation guidelines and/or standards put forth by, but not limited to, the Federal Aviation Administration (FAA), the European Aviation Safety Agency (EASA) or any other flight certification agency or organization or any other guidelines agency or organization, or the like.

FIG. 1 illustrates an aircraft cabin 100 including an aircraft seat 102, in accordance with one or more embodiments of the disclosure. FIGS. 2A-2E illustrate a seat frame 200 of the aircraft seat 102, in accordance with one or more embodiments of the disclosure.

The aircraft seat 102 may include, but is not limited to, a business class or first-class passenger seat, an economy-class passenger seat, a crew member seat, or the like. It is noted the terms "aircraft seats" and "passenger seats" may be considered equivalent, for purposes of the disclosure.

The aircraft seat 102 may be rotatable about an axis (e.g., swivelable). The aircraft seat 102 may be fully positionable between the outer limits of motion as defined by the moveable components of the aircraft seat 102. Where the aircraft seat 102 is installed within a passenger compartment, the aircraft seat 102 may be fully positionable between the outer limits of motion as defined by one or more passenger compartment monuments of the passenger compartment. It is noted an upright or raised position may be considered a taxi, takeoff, or landing (TTL) position during select stages of flight (though the upright or raised position is not limited to use during the select stages of flight as the TTL position, but also may be used at any point during the flight), for purposes of the present disclosure. In addition, it is noted that any position that does not meet the above-defined requirements of the TTL position may be considered a non-TTL position, for purposes of the present disclosure. Further, it is noted the aircraft seat 102 may be actuatable (e.g., translatable and/or rotatable) from the TTL position to a non-TTL position, and/or vice versa. Further, it is noted the aircraft seat 102 may be capable of a fully upright or raised position, and that the TTL position may have a more reclined seatback cushion and a more angled upward seat pan cushion as compared to the fully upright or raised position. Therefore, the above description should not be interpreted as a limitation on the present disclosure but merely an illustration.

In general, an aircraft seat 102 may be translatable (e.g., trackable or slidable). The aircraft seat 102 may be rotatable about an axis cross-wise through the aircraft seat 102 into a position including, but not limited to, the upright or raised position, one or more lounge or reclined positions, and a lie-flat or bed position. For example, the aircraft seat 102 may transition directly between the upright or raised position and the lie-flat or bed position. By way of another example, it is noted the aircraft seat 102 may transition through one or more lounge or reclined positions between the upright or raised position and the lie-flat or bed position. By way of another example, the aircraft seat 102 may transition into one or more lounge or reclined positions in a motion separate from the transition between the upright or raised position and the lie-flat or bed position. Therefore, the above description should not be interpreted as a limitation on the scope of the disclosure but merely an illustration.

The aircraft seat 102 may include a seatback 104. The aircraft seat 102 may include a seat pan 106. The aircraft seat 102 may include one or more arms 108. The aircraft seat 102 may be coupled to a base 110. The base 110 may be couplable to a floor of the aircraft cabin 100. For example, the base assembly 110 may be couplable to the floor of the aircraft cabin 100 via one or more tracks (not shown), one or more track covers, and/or one or more floor fittings (or track fasteners).

The seatback 104 may include a headrest. For example, the headrest may be integrated within the seatback 104. By way of another example, the headrest may be a separate component coupled to (or inserted into) the seatback 104. For instance, the headrest may be movable relative to the seatback frame of the aircraft seat 102 (e.g., adjustable, removable, or the like The aircraft seat 102 may include a frame 200. The frame 200 may include a seatback frame 202 and a seat frame 204. The aircraft seat 102 may include a seat pan frame 206. The seat frame 204 may include one or more components 208 and/or one or more components 210. For example, the one or more components 208, 210 may be configured to allow and/or assist the aircraft seat 102 to recline and/or return to an upright position.

One or more of the seatback frame 202 and/or the seat pan frame 206 may be directly coupled, or indirectly coupled via one or more interconnecting components, to the one or more of the components 208, 210 of the seat frame 204.

The base assembly 210 may include one or more legs 212. For example, the base assembly may include one or more front legs and one or more rear legs. The one or more legs 212 may be couplable to one or more portions of the frame 200 of the aircraft seat 102. For example, the one or more legs 212 may be couplable to one or more structural beams 214. By way of another example, the one or more legs 212 may be couplable to one or more spreaders 216 (e.g., front and/or rear openings). In this regard, the one or more legs 212 may be configured to attach to the one or more structural beams 214 and/or one or more spreaders 216 and secure to the one or more tracks located in the floor of the aircraft cabin via the one or more fittings.

The aircraft seat 102 may include a recline lockout device 300 configured to prevent the aircraft seat 102 from reclining when in the locked/deployed position. It is noted that the recline lockout device 300 may be adapted and mounted in any orientation to cater to various aircraft seat base designs and requirements.

Figure 2A:
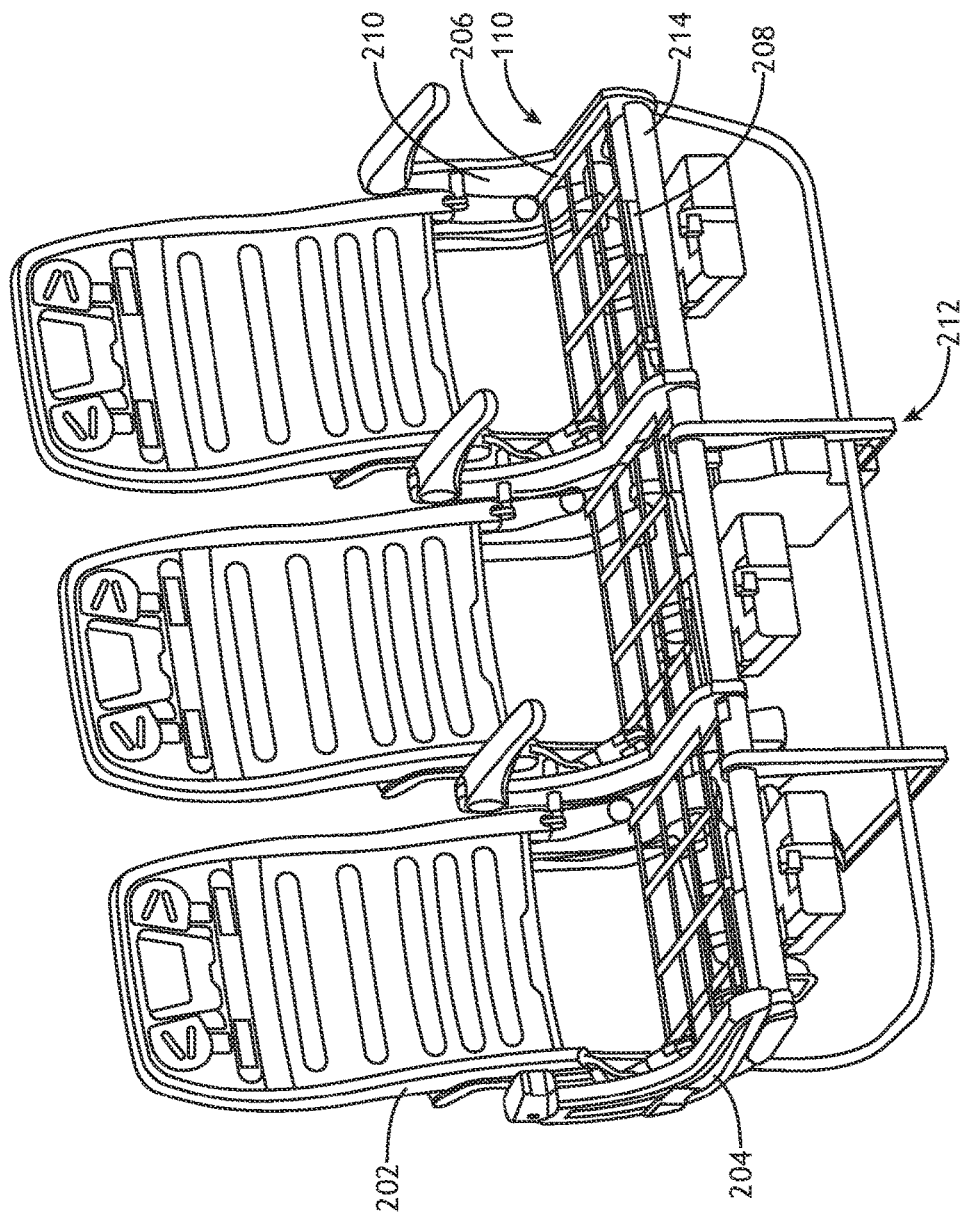
FIG. 2A is a perspective view of a seat frame and a base assembly of the aircraft seat including the recline lockout device, in accordance with one or more embodiments of the disclosure.
Figure 2B:
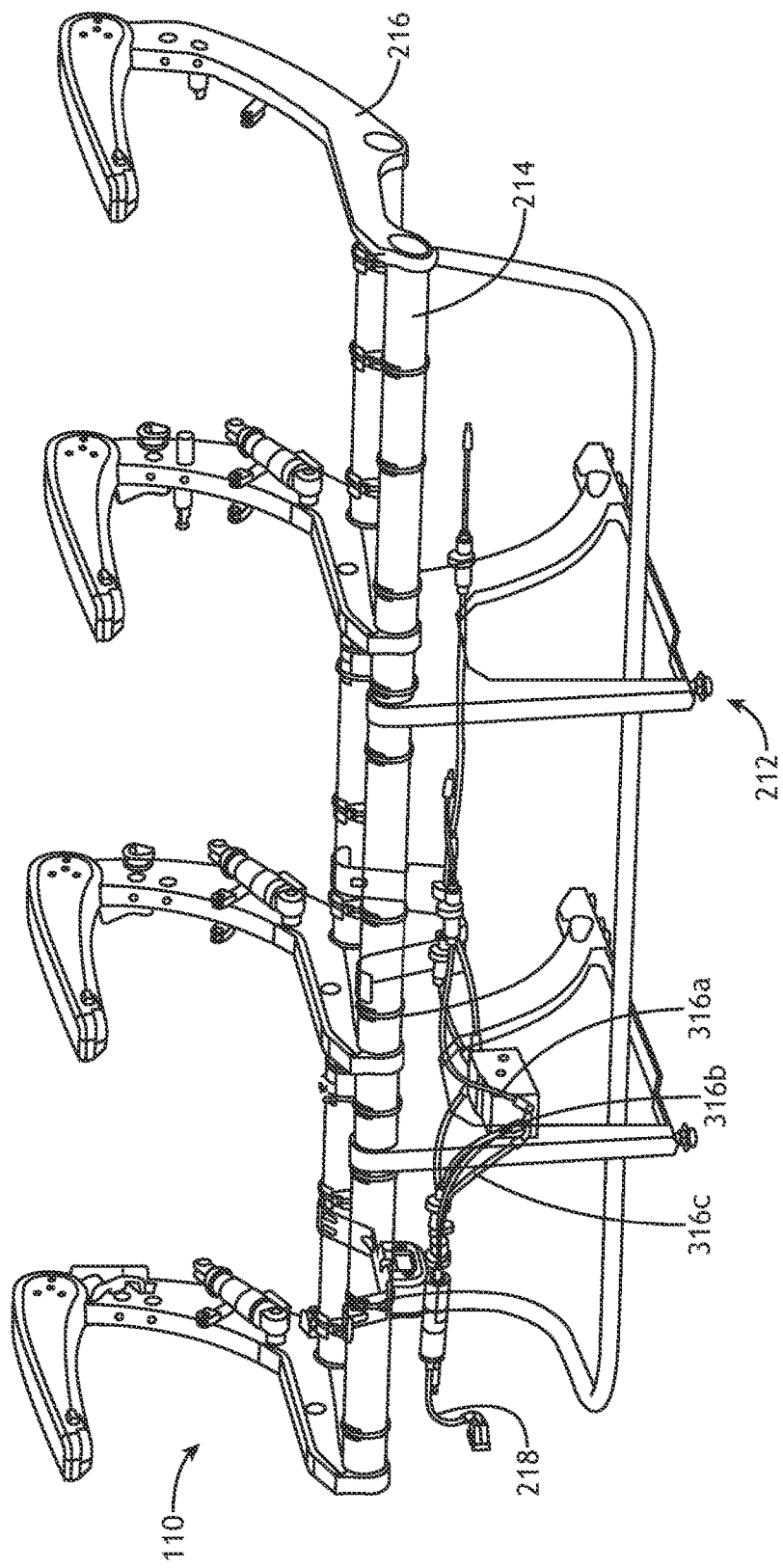
FIG. 2B is a perspective view of a seat frame and a base assembly of the aircraft seat including the recline lockout device, in accordance with one or more embodiments of the disclosure.
Figure 2C:
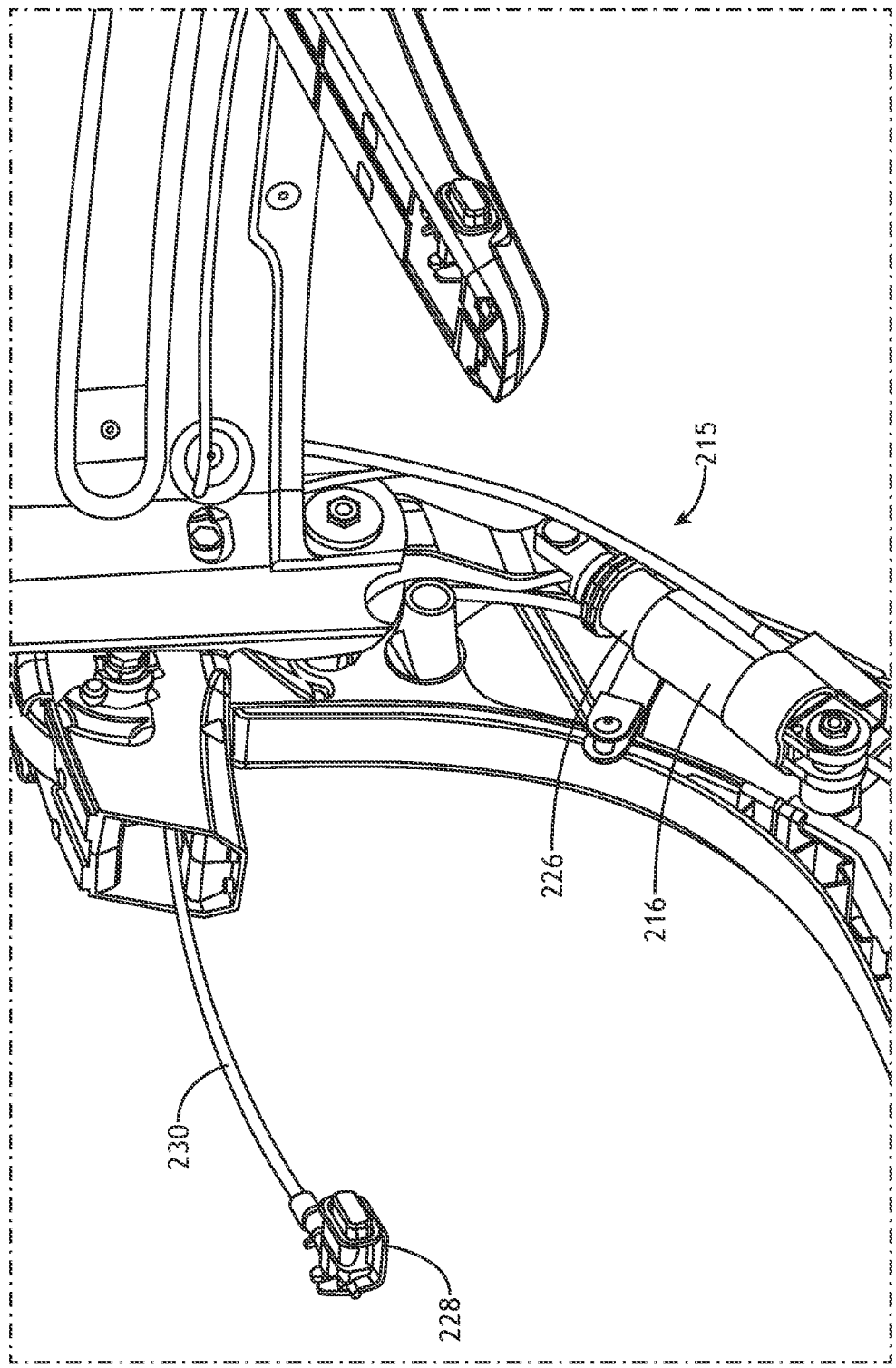
FIG. 2C is an isolated view of the seat frame of the aircraft seat including the recline lockout device, in accordance with one or more embodiments of the disclosure.
Figure 2D:
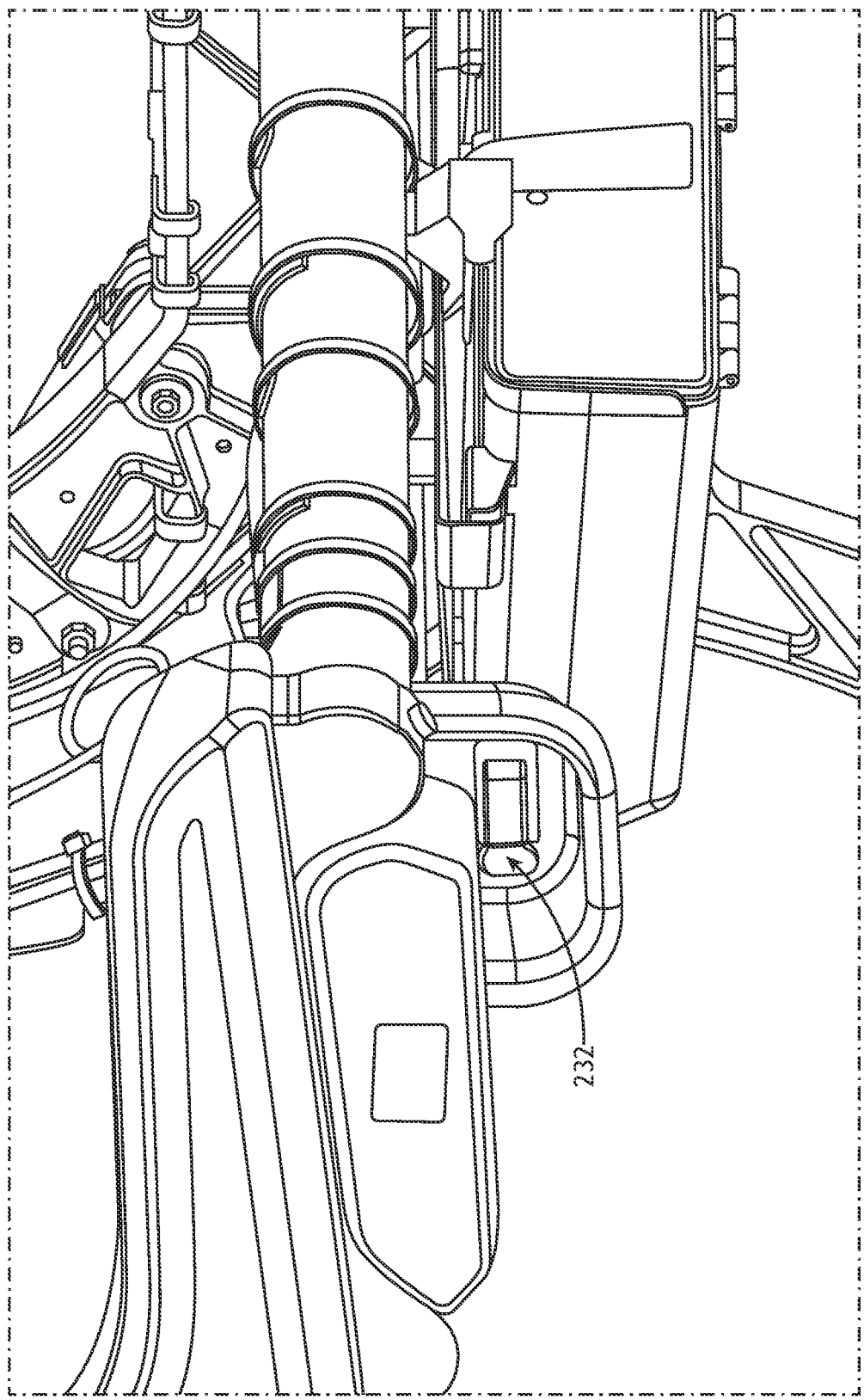
FIG. 2D is an isolated view of the seat frame of the aircraft seat including the recline lockout device, in accordance with one or more embodiments of the disclosure.
Figure 2E:
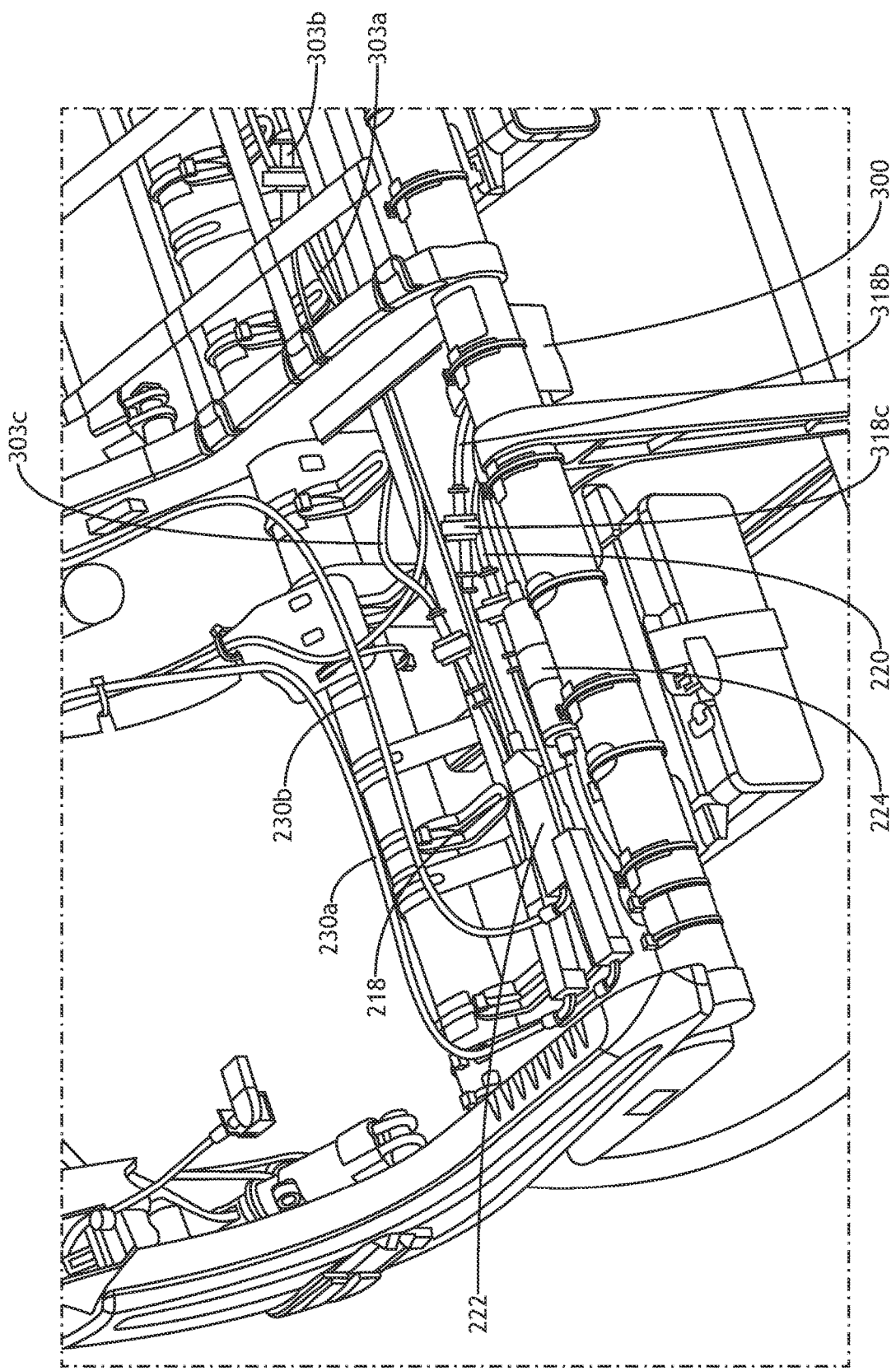
FIG. 2E is an isolated view of the seat frame of the aircraft seat including the recline lockout device, in accordance with one or more embodiments of the disclosure.

Although FIGS. 1-2E depict the aircraft cabin 100 including a row of aircraft seats 102 including the recline lockout device 300, it is noted that FIGS. 1-2E are provided merely for illustrative purposes and shall not be construed as limiting the scope of the present disclosure. For example, the aircraft cabin 100 may include one or more individual aircraft seats 102 including the recline lockout device 300.

Figure 3A:
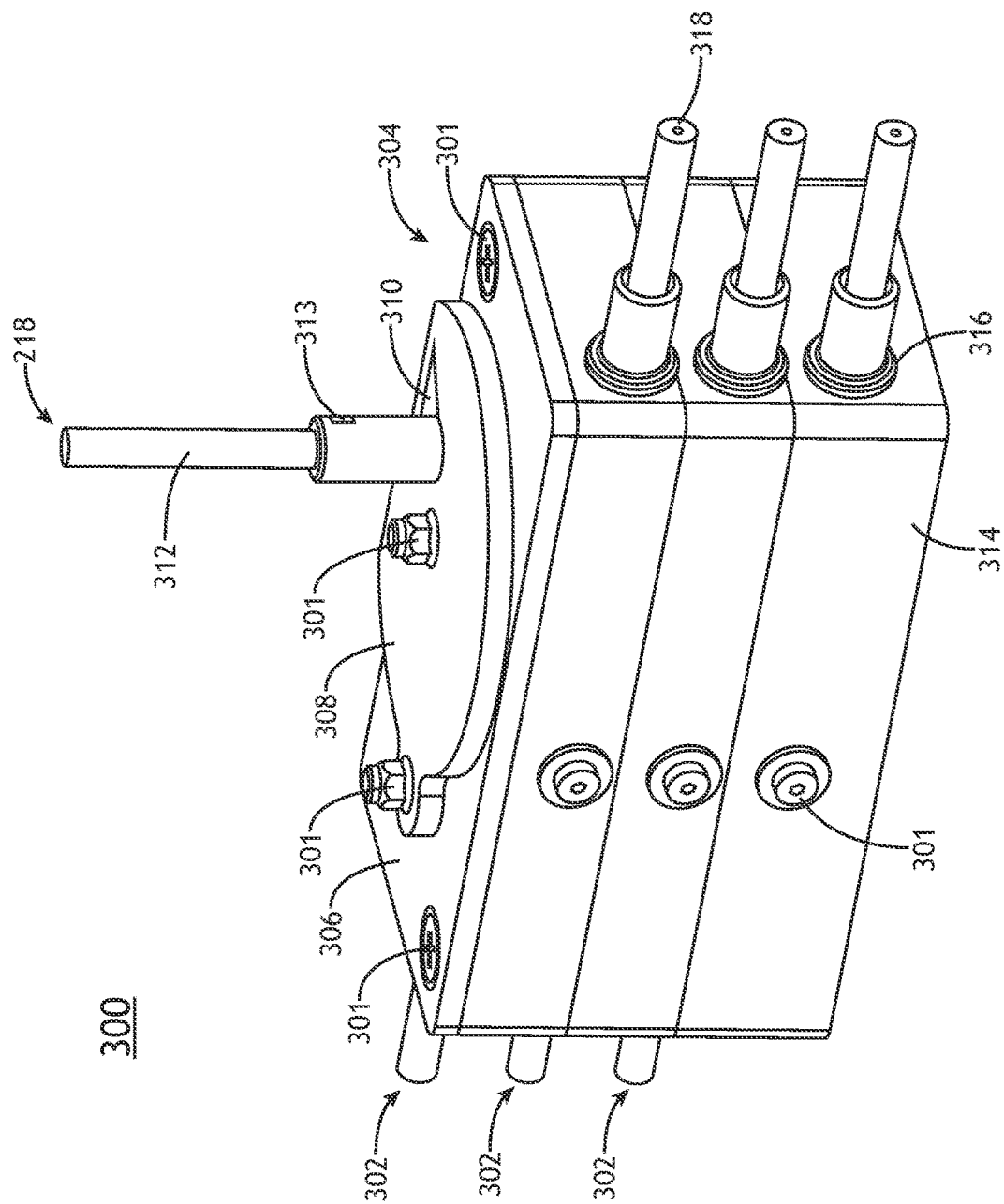
FIG. 3A is a perspective view of the recline lockout device, in accordance with one or more embodiments of the disclosure.
Figure 3B:
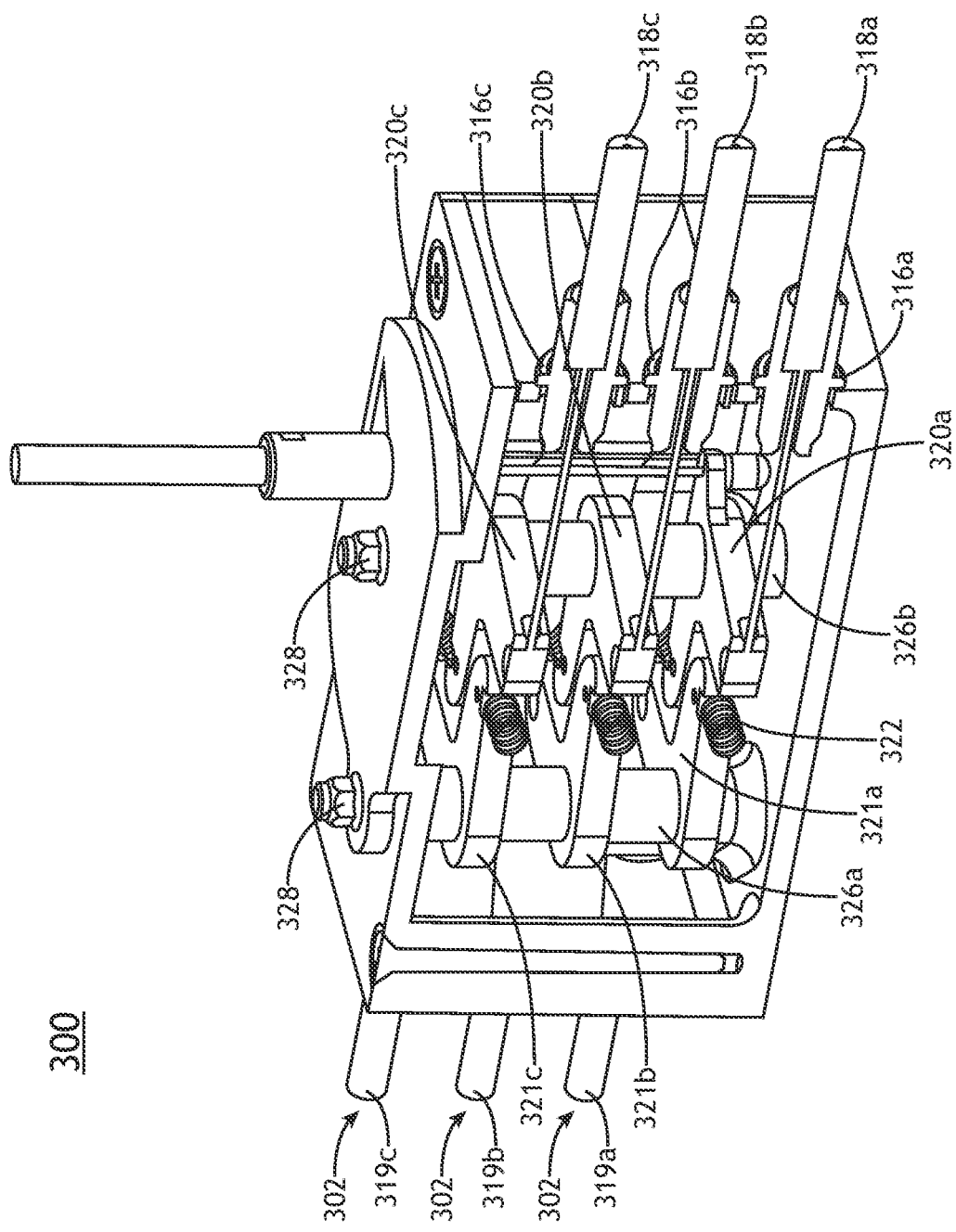
FIG. 3B is a perspective cross-sectional view of the recline lockout device in the unlocked position, in accordance with one or more embodiments of the disclosure.
Figure 3C:
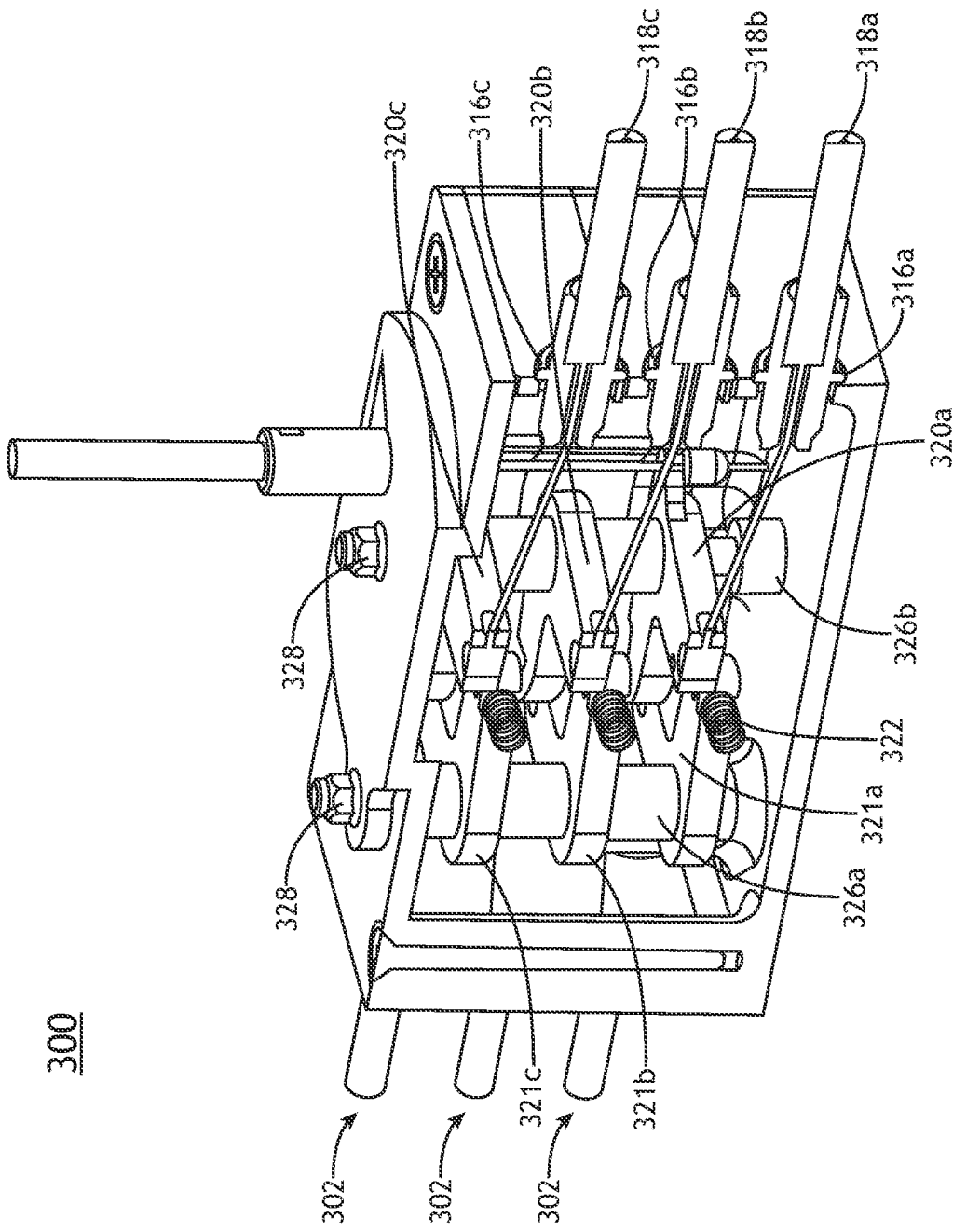
FIG. 3C is a perspective cross-sectional view of the recline lockout device in the locked position, in accordance with one or more embodiments of the disclosure.
Figure 3D:
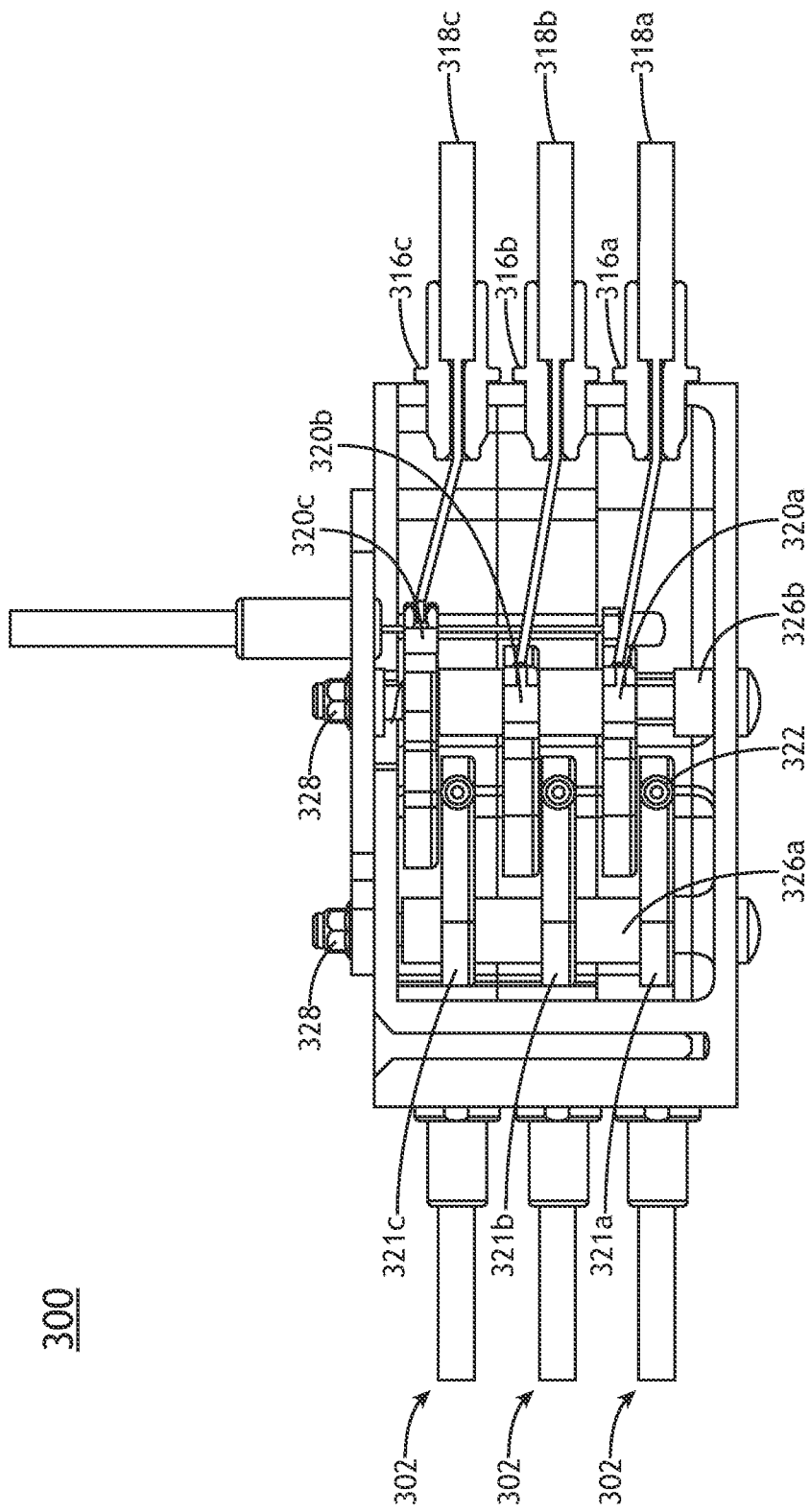
FIG. 3D is a cross-sectional view of the recline lockout device in the locked position, in accordance with one or more embodiments of the disclosure.
Figure 3E:
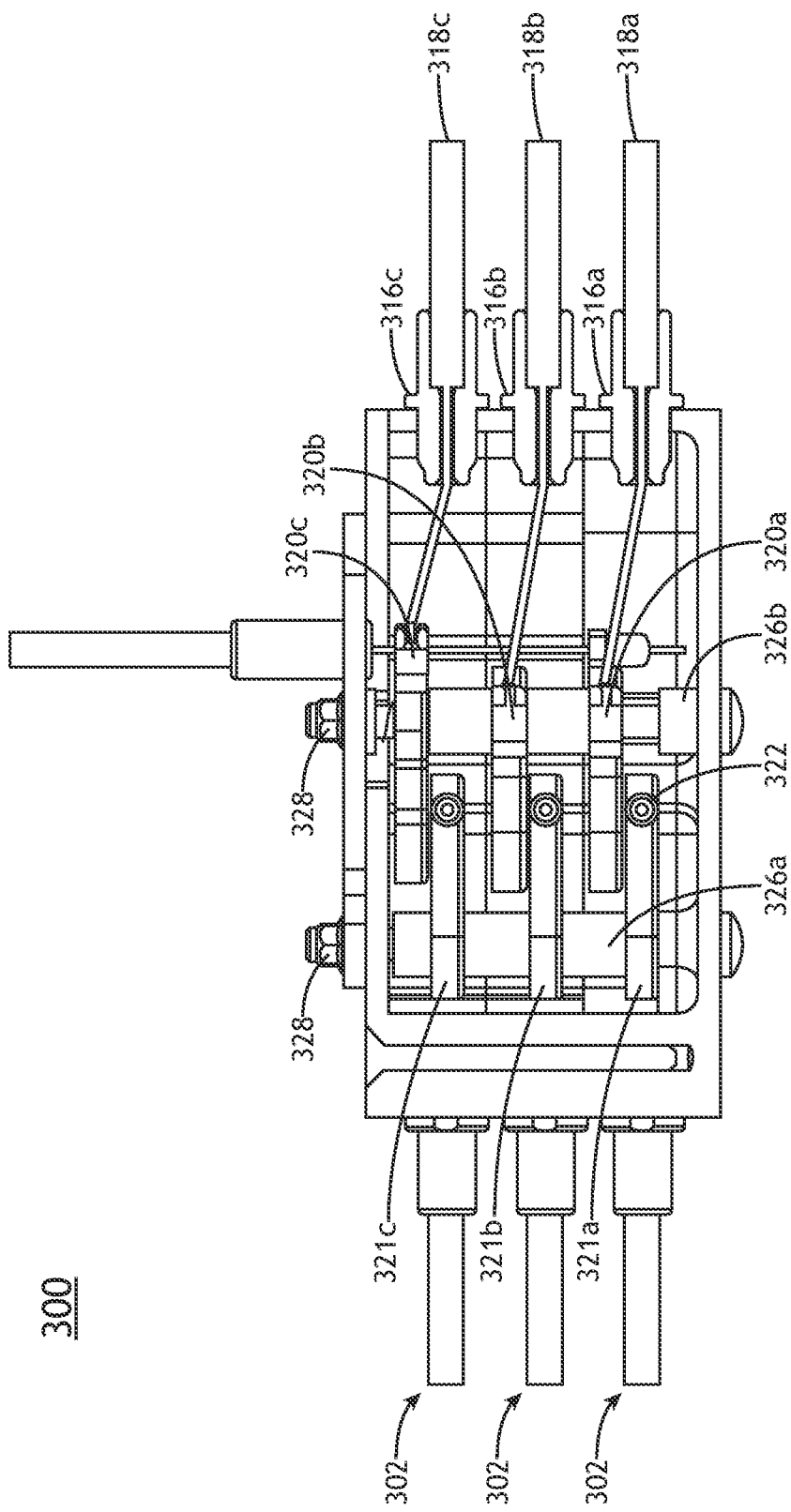
FIG. 3E is a cross-sectional view of the recline lockout device in the locked position, in accordance with one or more embodiments of the disclosure.

FIGS. 3A-3E illustrate the recline lockout device 300, in accordance with one or more embodiments of the present disclosure. In particular, FIG. 3A depicts a perspective view of the recline lockout device 300, in accordance with one or more embodiments of the present disclosure. In particular, FIG. 3B depicts a perspective cross-sectional view of the recline lockout device 300 in the unlocked position, in accordance with one or more embodiments of the present disclosure. In particular, FIG. 3C depicts a perspective cross-sectional view of the recline lockout device 300 in the locked/deployed position, in accordance with one or more embodiments of the present disclosure. In particular, FIG. 3D depicts a cross-sectional view of the recline lockout device 300 in the locked position, in accordance with one or more embodiments of the present disclosure. In particular, FIG. 3E depicts a cross-sectional view of the recline lockout device 300 in the locked position, in accordance with one or more embodiments of the present disclosure.

The recline lockout device 300 may include one or more modular lockout assemblies 302. For example, as shown in FIGS. 3A-3E, the device 300 may include a first modular lockout assembly 302 (e.g., a bottom lockout assembly 302), a second modular lockout assembly 302 (e.g., a middle lockout assembly 302), and a third modular lockout assembly 302 (e.g., a top lockout assembly 302). In this regard, each modular lockout assembly 302 may be coupled to a respective aircraft seat 102, such that the first lockout assembly 302 corresponds to a first aircraft seat 102, the second lockout assembly 302 corresponds to a second aircraft seat 102, and the third lockout assembly 302 corresponds to a third aircraft seat 102. It is noted that the lockout device 300 may include any number and/or configuration of modular lockout assemblies 302 suitable for coupling to any number and/or configuration of aircraft seats 102.

The one or more modular lockout assemblies 302 may be stackable. For example, as shown in FIGS. 3A-3E, the second modular lockout assembly 302 (e.g., middle lockout assembly 302) may be stacked at least partially on top of the first modular lockout assembly 302 (e.g., bottom lockout assembly 302). By way of another example, the third modular lockout assembly 302 (e.g., top lockout assembly 302) may be stacked at least partially on top of the second modular lockout assembly 302 (e.g., middle lockout assembly 302). In this regard, the modular lockout assemblies 302 may be adaptable based on the number of seats and/or the space constraints onboard the aircraft.

The recline lockout device 300 may include a top plate assembly 304. For example, the recline lockout device 300 may include a top plate assembly 304 coupled to the one or more modular lockout assemblies 302. For instance, the top plate assembly 304 may be coupled to one or more modular lockout assemblies 302 via one or more fasteners 301 (e.g., screws, bolts, and the like).

The top plate assembly 304 may include a top plate 306 coupled to the one or more modular lockout assemblies 302. The top plate 306 may include one or more raised portions 308.

The top plate assembly 304 may include one or more lockout cable openings 310 configured to receive one or more lockout cables 312. For example, the raised portion 308 of the top plate 306 may include one or more lockout cable openings 310.

The one or more lockout cables 312 may include one or more conduit end fittings 313.

Referring to FIGS. 2A-2E, the one or more lockout cables 312 may be coupled to an actuator assembly 215 via a lockout cable assembly 218.

Referring to FIG. 2E, the lockout cable assembly 218 may include, but is not limited to, one or more adjusters 220, one or more disconnects 222, and one or more compensators 224.

The actuator assembly 215 may include one or more actuators 226 coupled to one or more user control devices 228 via one or more actuating cables 230. The one or more actuators 226 may include any type of actuator known in the art including, but not limited to, one or more gas springs, one or more hydraulic spring actuators, or the like.

The one or more user control devices 228 may be positioned within the armrest of the aircraft seat 102. The one or more user control devices 228 may include any user control device including, but not limited to, one or more buttons, one or more levers, one or more knobs, or the like.

The one or more disconnects 222 may be configured to couple to the one or more actuating cables 230 coupled to the actuator 226 to the lockout device 300. The one or more disconnects 222 may couple to a first set of actuating cables 230a coupled to the actuator 226 and a second set of actuating cables 230b coupled to the lockout device 300.

For example, the one or more adjusters 220 may be configured to adjust a length of the one or more actuating cables 230 coupled to the one or more disconnects 222. By way of another example, the one or more compensators 224 may be configured to adjust a length of the one or more actuating cables 230 coupled to the one or more disconnects 222. For instance, the one or more compensators 224 may remove any slack in the one or more actuating cables 230 to allow for overtravel of the actuator 226 without stretching the one or more actuating cables. In this regard, the lockout cable assembly 218 may be configured to integrate the lockout device 300 with the actuator assembly 216 of the aircraft seat 102, such that the lockout device 300 may "disengage" the one or more actuating cables 230 from reclining the aircraft seat 102.

The aircraft seat 102 may include one or more lockout mechanisms 232 coupled to a portion of the seat frame 200. The one or more lockout mechanisms 232 may include, but are not limited to, one or more levers, one or more buttons, one or more knobs, one or more switches, or the like.

The one or more lockout mechanisms 232 may be arranged proximate to the aircraft seat 102 (or rows of aircraft seats 102). For example, the lockout lever 232 may be coupled to the seat pan frame 204. In this regard, the lockout lever 232 may be hidden from passengers, while still being accessible to crew members when the passenger is occupying the respective aircraft seat (or rows of aircraft seats).

The lockout lever 232 may be coupled to the lockout cable assembly 218 to "disconnect" (or lockout) the one or more actuating cables 230 to prevent the aircraft seat 102 from reclining. For example, when engaged, the lever 232 may disengage the one or more actuating cables 230 coupled to the actuator 226, such that the actuator 226 is not able to recline the seat. In this regard, a crew member may disengage the reclining feature of the seat to prevent the passenger from individually reclining the seat 102 via the user control button 228, as will be discussed further herein.

Figure 4:
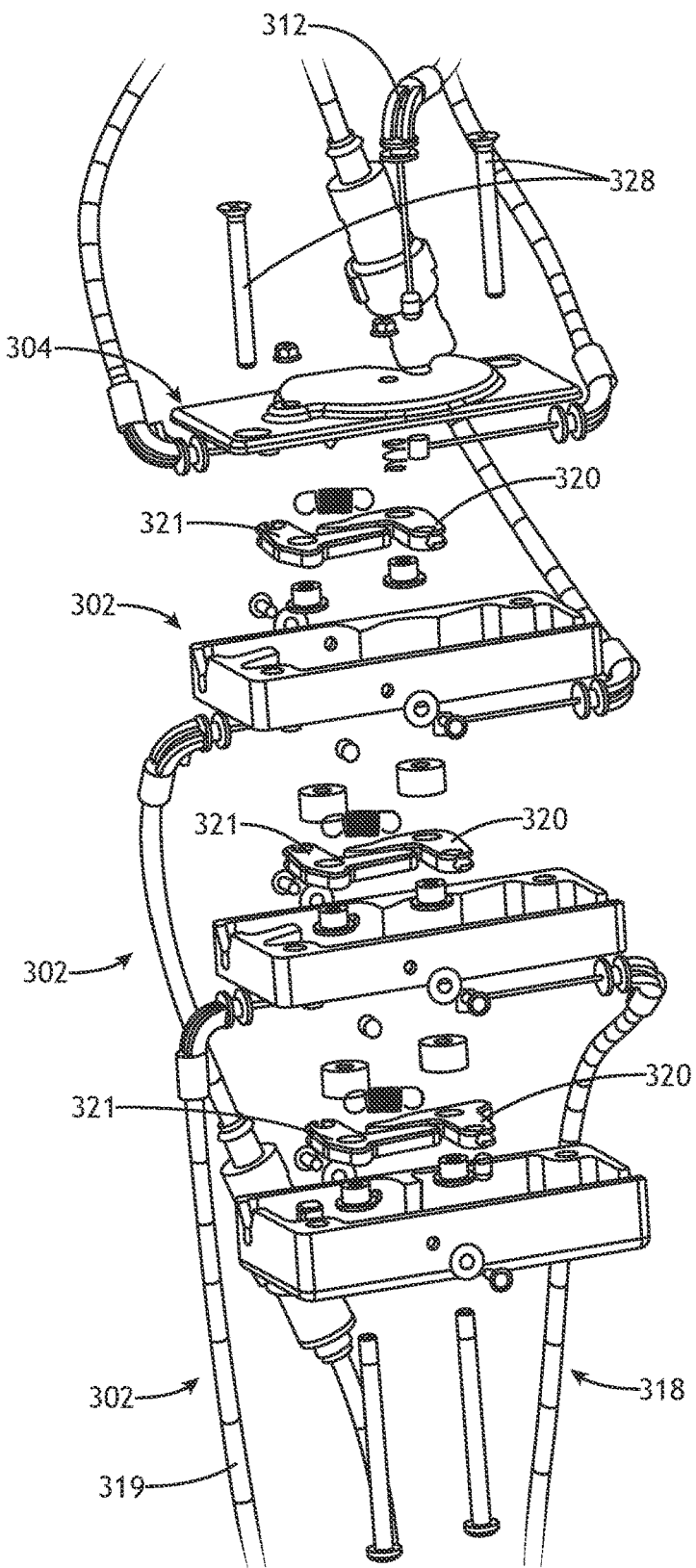
FIG. 4 is an exploded view of the recline lockout device, in accordance with one or more embodiments of the disclosure.
Figure 5A:
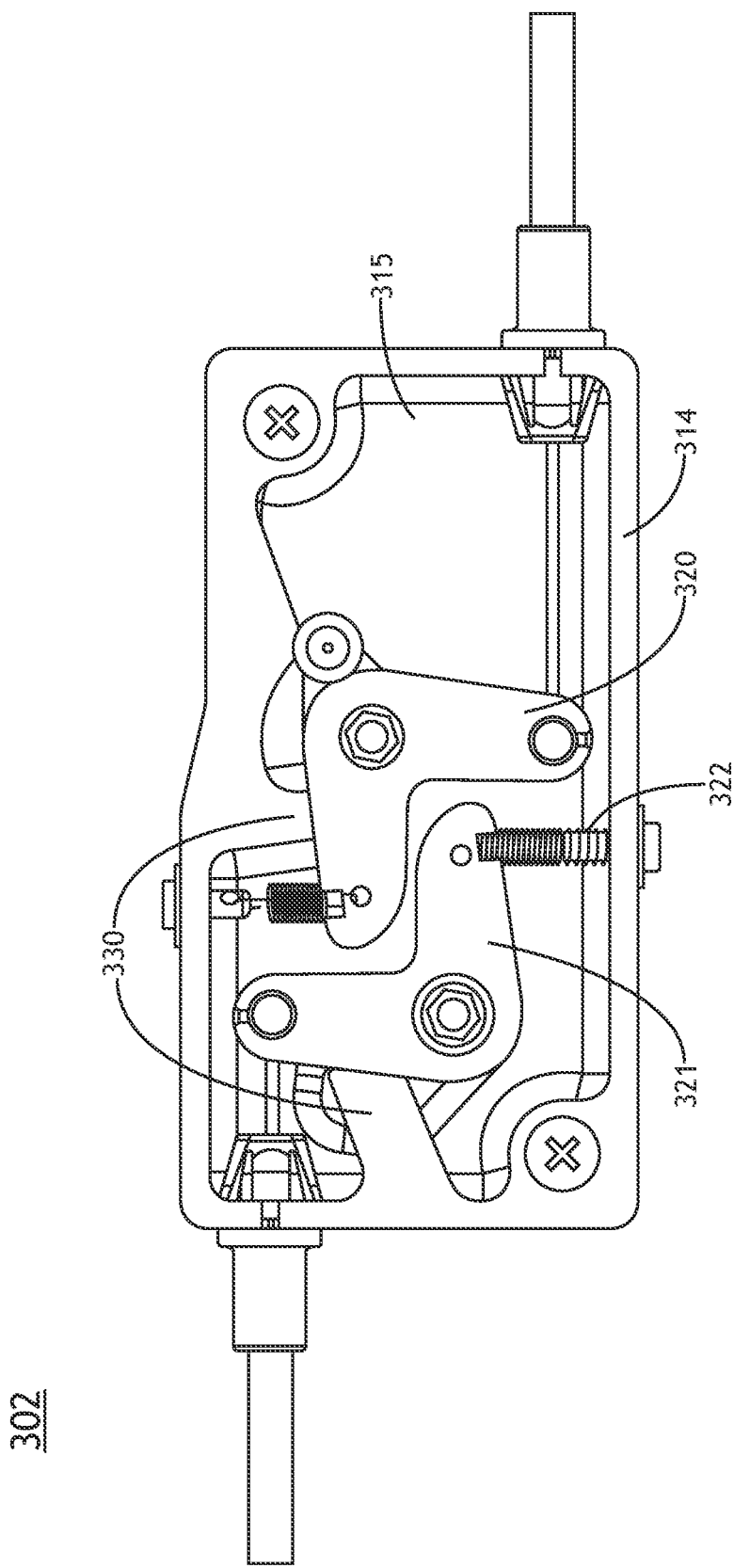
FIG. 5A is a cross-sectional view of the recline lockout device in the unlocked position, in accordance with one or more embodiments of the disclosure.
Figure 5B:
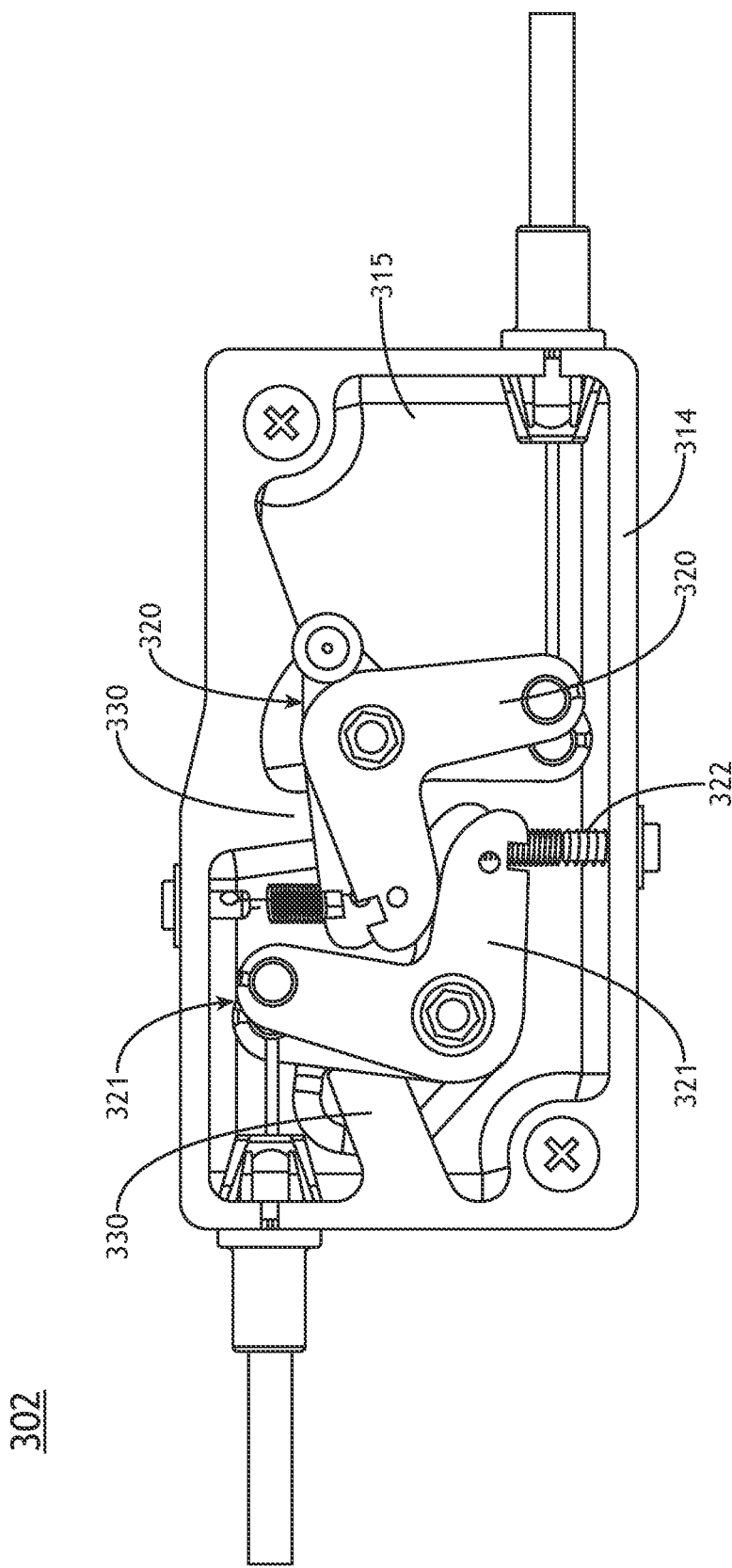
FIG. 5B is a cross-sectional view of the recline lockout device in the unlocked position, in accordance with one or more embodiments of the disclosure.

FIGS. 4-5B illustrate a modular lockout assembly 302 of the recline lockout device 300, in accordance with one or more embodiments of the present disclosure. In particular, FIG. 4 depicts an exploded view of the modular lockout assembly 302 of the recline lockout device 300, in accordance with one or more embodiments of the present disclosure. In particular, FIG. 5A depicts a cross-sectional view of the modular lockout assembly 302 of the recline lockout device 300 in the unlocked position, in accordance with one or more embodiments of the present disclosure. In particular, FIG. 5B depicts a cross-sectional view of the modular lockout assembly 302 of the recline lockout device 300 in the unlocked position where the levers do not interact out of plane, in accordance with one or more embodiments of the present disclosure.

Referring to FIGS. 3A-5B, each modular lockout assembly 302 may include a housing 314. One or more sidewalls of the housing 314 may define a cavity 315.

The housing 314 may include one or more cable openings 316 configured to receive one or more input cables 318 and one or more output cables 319. For example, the housing 314 may include a first input cable opening 316a configured to receive a first input cable 318a, a second input cable opening 316b configured to receive a second input cable 318b, and a third input cable opening 316c configured to receive a third input cable 318c. By way of another example, the housing 314 may include a first output cable opening configured to receive a first output cable 319a, a second output cable opening configured to receive a second output cable 319b, and a third output cable opening configured to receive a third output cable 319c. For instance, the first input/output cables 318a, 319a may coupled to the seat recline mechanism of the first aircraft seat, the second input/output cables 318b, 319b may be coupled to the seat recline mechanism of the second aircraft seat, and the third input/output cables 318c, 319c may be coupled to the seat recline mechanism of the third aircraft seat, as shown in FIGS. 3A-3B.

Each modular lockout assembly 302 may include one or more levers housed within the cavity 315 of the housing 314. For example, each modular lockout assembly 302 may include one or more input levers 320 and one or more output levers 321. For instance, as shown in FIG. 3B, the first modular lockout assembly 302 (e.g., a bottom lockout assembly 302) may include a first input lever 320a and a first output lever 321a, the second modular lockout assembly 302 (e.g., a middle lockout assembly 302) may include a second input lever 320b and a second output lever 321b, and the third modular lockout assembly (e.g., a top lockout assembly 302) may include a third input lever 320c and a third output lever 321c.

When the lockout mechanism 232 is actuated, as discussed further herein, the lockout mechanism 232 may be configured to pulls on the lockout cable 312. Upon pulling the lockout cable 312, the one or more input levers 320 (e.g., input levers 320a-c) may translate along the shaft 328 to move the respective levers 320b-c out of plane with the one or more output levers 321. In this regard, the output levers 321 are only able to rotate about the shaft and the one or more input levers 320 are able to translate vertical along the shaft and rotate about that shaft. When the levers are out of plane, they are no longer able to interact with each other which effectively "locks out" the system, such that when one lever is "disengaged" the respective lever does not interact with the additional lever and thus disables the passenger's ability to recline the aircraft seat 102 via the actuator 226, as shown in FIGS. 5A-5B.

Each modular lockout assembly 302 may include one or more latch springs 322 coupling the one or more levers 320 to a surface of the housing 314 via one or more fasteners 301.

Each modular lockout assembly 302 may include one or more spacers 326 spaced between the one or more levers 320. For example, the one or more spacers 326 may be arranged along a shaft 328 positioned along the vertical axis of the lockout device 300. In this regard, the one or more levers 320 may pivot about the shaft 328 positioned along the vertical axis of the lockout device 300.

Although though not shown, each modular lockout assembly 302 may further include one or more bearings positioned between the shaft 328 and the one or more levers 320, 321.

Referring to FIGS. 5A-5B, the cavity 315 of the housing 314 may include one or more stopping surfaces 330. For example, the one or more stopping surfaces 330 may act as a stopper to prevent the one or more levers 320, 321 from pivoting beyond a specified point.

To disengage the recline feature, a crew member (e.g., flight attendant, pilot, maintenance member, etc.) may engage the lever 232. Upon engaging the lever 232, the lockout cable 312 may translate to cause the input levers 320a-c to translate (as shown in FIG. 3C), such that the respective levers do not interact with the output cables 321a-c (as shown in FIG. 3D-3E), or vice versa. In this regard, the cables 318, 319 are "locked out" to prevent the aircraft seat 102 from reclining via the actuator 226, such that a passenger is not able to individually recline their respective aircraft seat 102 (via the user button 228).

For example, when the lockout mechanism 232 is actuated, it pulls on the lockout cable 312. When the lockout cable 312 is pulled, it in turn pulls on the input lever 320a to move the respective levers 320a, 320b, such that the lever 320b is positioned above the lever 321b and out of plane with the output lever 321. The output levers 321a, 321b are only able to rotate about the shaft 328 where the input levers 320a and levers 320b are able to translate vertical along the shaft 328 and rotate about that shaft 328. When the levers are out of plane, they are no longer able to interact with each other which effectively "locks out" the system.

Although the disclosure has been described with reference to the embodiments illustrated in the attached drawing figures, equivalents may be employed and substitutions made herein without departing from the scope of the claims. Components illustrated and described herein are merely examples of a system/device and components that may be used to implement embodiments of the disclosure and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A recline lockout device for one or more aircraft seats, the device comprising:
   one or more modular lockout assemblies, each modular lockout assembly comprising:
      a housing including one or more sidewalls that define a cavity, the housing including one or more cable openings configured to receive one or more recline cables;
      one or more levers housed at least partially within the cavity of the housing, the one or more levers including at least a first lever coupled to a first recline cable of the one or more recline cables and a second lever coupled to a second recline cable of the one or more recline cables; and
      one or more shafts, the one or more shafts including at least a first shaft and a second shaft, the first lever of the one or more levers configured to receive a portion of the first shaft and the second lever of the one or more levers configured to receive a portion of the second shaft, wherein the first lever is configured to pivot about an axis of the first shaft and the second lever is configured to pivot about an axis of the second shaft;
   one or more lockout cables coupled to one or more actuator assemblies of the one or more aircraft seats and at least one lever of the one or more levers, each actuator assembly configured to position the one or more aircraft seats between one of an upright position and a reclined position; and
   one or more lockout control mechanisms configured to cause the one or more lockout cables to translate along an axis of the recline lockout device,
   upon translating the one or more lockout cables along the axis, at least one of the first lever or the second lever is configured to translate along the axis to cause the first lever to disengage from the second lever,
   upon disengaging the first lever from the second lever, the first lever is configured to disengage from the second recline cable to prevent the one or more actuator assemblies from actuating between the upright position and the reclined position.

2. The device of claim 1, wherein each modular lockout assembly further comprises:
   one or more latch springs configured to couple the one or more levers to a sidewall of the one or more sidewalls of the housing.

3. The device of claim 1, further comprising:
   a top plate, the top plate including one or more lockout cable openings configured to receive the one or more lockout cables, the top plate configured to couple to the housing of at least one modular lockout assembly of the one or more modular lockout assemblies.

4. The device of claim 1, wherein the one or more shafts include one or more bearings.

5. The device of claim 1, further comprising:
   one or more lockout cable assemblies, each lockout cable assembly comprising at least one of one or more adjusters, one or more disconnects, or one or more compensators.

6. The device of claim 1, wherein the one or more sidewalls of the housing including one or more stopper surfaces configured to prevent the one or more levers from pivoting a predetermined threshold.

7. The device of claim 1, wherein the one or more lockout control mechanisms comprises:
   one or more lockout levers coupled to a seat pan frame of the aircraft seat.

8. The device of claim 1, wherein the recline lockout device is coupled to a seat frame of the one or more aircraft seats.

9. The device of claim 1, wherein the one or more modular assemblies comprise:
   a first modular assembly corresponding to a first aircraft seat within a row of aircraft seats; and
   one or more additional modular assemblies, each additional modular assembly corresponding to a respective aircraft seat within the row of aircraft seats,
   wherein the one or more additional modular assemblies are configured to be stacked on the first modular assembly.

10. A row of aircraft seats, the row of aircraft seats comprising:
    a seat frame;
    one or more actuator assemblies, each actuator assembly including an actuator and one or more actuating cables, the actuator configured to position the one or more aircraft seats between one of an upright position and a reclined position, each actuator assembly further including one or more passenger recline mechanisms configured to cause the actuator to position the one or more aircraft seats between one of the upright position and the recline position; and
    a recline lockout device coupled to the seat frame, the recline lockout device comprising:
       one or more modular lockout assemblies, each modular lockout assembly comprising:
          a housing including one or more sidewalls that define a cavity, the housing including one or more cable openings configured to receive one or more recline cables;
          one or more levers housed at least partially within the cavity of the housing, the one or more levers including at least a first lever coupled to a first recline cable of the one or more recline cables and a second lever coupled to a second recline cable of the one or more recline cables; and
          one or more shafts, the one or more shafts including at least a first shaft and a second shaft, the first lever of the one or more levers configured to receive a portion of the first shaft and the second lever of the one or more levers configured to receive a portion of the second shaft, wherein the first lever is configured to pivot about an axis of the first shaft and the second lever is configured to pivot about an axis of the second shaft;

one or more lockout cables coupled to the one or more actuator assemblies and at least one lever of the one or more levers; and one or more lockout control mechanisms configured to cause the one or more lockout cables to translate along an axis of the recline lockout device, upon translating the one or more lockout cables along the axis, at least one of the first lever or the second lever is configured to translate along the axis to cause the first lever to disengage from the second lever, upon disengaging the first lever from the second lever, the first lever is configured to disengage from the second recline cable to prevent the one or more actuator assemblies from actuating between the upright position and the reclined position.

11. The row of aircraft seats of claim 10, wherein each modular lockout assembly further comprises:

one or more latch springs configured to couple the one or more levers to a sidewall of the one or more sidewalls of the housing.

12. The row of aircraft seats of claim 10, wherein the one or more shafts include one or more bearings.

13. The row of aircraft seats of claim 10, further comprising:

one or more lockout cable assemblies, each lockout cable assembly comprising at least one of one or more adjusters, one or more disconnects, or one or more compensators.

14. The row of aircraft seats of claim 10, wherein the one or more lockout control mechanisms comprises:

one or more lockout levers coupled to a seat pan frame of the aircraft seat.

15. The row of aircraft seats of claim 10, wherein the one or more modular assemblies comprise:

a first modular assembly corresponding to a first aircraft seat within the row of aircraft seats; and one or more additional modular assemblies, each additional modular assembly corresponding to a respective aircraft seat within the row of aircraft seats, wherein the one or more additional modular assemblies are configured to be stacked on the first modular assembly.

* * * * *